(12) United States Patent
Kopp et al.

(10) Patent No.: US 8,640,110 B2
(45) Date of Patent: Jan. 28, 2014

(54) BUSINESS OBJECT SERVICE SIMULATION (75) Inventors: Tilmann David Kopp, Karlsruhe (DE); Renzo Colle, Srutensce (DE); Ilijana Christov, Walldorf (DE); Daniel Zoch, Walldorf (DE); Ralf Schroth, St. Leon-Rot (DE); Thomas Hammer, Walldorf (DE)

(73) Assignee: SAP AG, Walldorf (DE)

( * ) Notice: Subject to any disclaimer, the term of this patent is extended or adjusted under 35 U.S.C. 154(b) by 474 days.

(21) Appl. No.: 12/955,360

(22) Filed: Nov. 29, 2010

(65) Prior Publication Data

US 2012/0137267 A1 May 31, 2012

(51) Int. Cl.
*G06F 9/44* (2006.01)

(52) U.S. Cl.
USPC ............ 717/135; 717/102; 717/104; 717/109

(58) Field of Classification Search
None
See application file for complete search history.

(56) References Cited

U.S. PATENT DOCUMENTS

| | | | | |
|---|---|---|---|---|
| 7,954,091 | B2* | 5/2011 | Li et al. | 717/135 |
| 8,141,060 | B2* | 3/2012 | Raghavan et al. | 717/135 |
| 8,453,111 | B2* | 5/2013 | Hudson et al. | 717/109 |
| 2007/0088668 | A1* | 4/2007 | Larab et al. | 707/1 |
| 2009/0144694 | A1* | 6/2009 | Lin et al. | 717/102 |
| 2009/0172633 | A1* | 7/2009 | Tsyganskiy et al. | 717/104 |
| 2009/0300578 | A1* | 12/2009 | Neil | 717/104 |
| 2010/0199257 | A1* | 8/2010 | Biggerstaff | 717/104 |
| 2011/0067003 | A1* | 3/2011 | Slothouber et al. | 717/120 |
| 2011/0283267 | A1* | 11/2011 | Waite et al. | 717/135 |
| 2012/0174079 | A1* | 7/2012 | Luh | 717/135 |

OTHER PUBLICATIONS

Barjis et al., Modeling and simulation driven software development, Apr. 2011, 7 pages.*
Kostanyan et al., An approach for formal verification of business processes, Mar. 2009, 8 pages.*
Leong et al., Web services integration on the fly for service-oriented computing and simulation, Mar. 2009, 8 pages.*

* cited by examiner

*Primary Examiner* — Thuy Dao
(74) *Attorney, Agent, or Firm* — Mintz, Levin, Cohn, Ferris, Glovsky and Popeo, P.C.

(57) ABSTRACT

Systems, methods, computer program products, and the like for performing business object service simulation are disclosed. A runtime model of a business object can be generated. The runtime model can include a plurality of structural and functional entities. A simulation runtime model of the business object can be instantiated. The simulation runtime model can include a plurality of pseudo-structural and pseudo-functional entities. During the simulation runtime model, a predetermined business object service of the business object can be selected and at least one parameter of the predetermined business object service can be determined. Functional entities of the runtime model can be replaced with pseudo-functional entities of the simulation runtime model. The simulation runtime model can be executed using pseudo-functional entities.

20 Claims, 5 Drawing Sheets

BUSINESS OBJECT SERVICE SIMULATION

TECHNICAL FIELD

This disclosure relates generally to data processing and, in particular, to determining a behavior of a business object.

BACKGROUND

Many currently available enterprise systems operate at an application platform in which business objects, which are a type of data object, describe a structure and behavior of real-world objects. A business object can include a hierarchy of business object nodes, which represent data as attributes, and can be an independently viable entity with identifiable instances. A business object can also bundle functions and data, both of which can be accessible from outside of the business object. Further, it can be described by a data model, an internal process model, and one or more service interfaces and can be a core structuring element of applications that are centrally defined by a developer as part of an overall governance process.

Various software applications currently employed by many industries involve usage of business objects. Business objects provide business object services in order to offer functionality to consumers. A developer typically performs a design of a system containing business objects as well as business objects themselves. Once the objects have been designed and tested, they can be typically provided to the end user for an appropriate use.

At the time of designing a business object, the business object can be defined using a business object model describing structural and functional entities of the business object. At the time of running a business object, the business object model is instantiated as a business object runtime model. As soon as a business object service is invoked at runtime, the relevant functional entities are looked up in the model, instantiated and executed by a business object runtime. During a business object service execution, the business object runtime automatically executes functional entities whose triggering condition, specified in the business object runtime model, is fulfilled. For business objects containing many implicitly triggered functional entities, it is difficult to find if or why a certain functional entity might or might not be triggered during the execution of a business object service at all. Additionally, a calculation of the worst case scenario concerning maximum number of executed entities can be time-consuming.

SUMMARY

In one aspect, a method includes generating a runtime model of a business object. The runtime model includes a plurality of structural entities and a plurality of functional entities. A simulation runtime model of the business object is instantiated. The simulation runtime model includes a plurality of pseudo-structural entities and a plurality of pseudo-functional entities. During the simulation runtime model, a predetermined business object service of the business object is selected, and at least one parameter of the predetermined business object service is determined. During the simulation runtime model, the plurality of functional entities of the runtime model is replaced with the plurality of pseudo-functional entities of the simulation runtime model. During the simulation runtime model, the simulation runtime model is executed using the plurality of pseudo-functional entities.

In optional variations, one or more of the following features can also be included. A response of the plurality of pseudo-functional entities can be determined during execution of the simulation runtime model. Changes to at least one of the plurality of pseudo-structural entities can be executed based on the response of the plurality of pseudo-functional entities. A call of the plurality of pseudo-functional entities can be generated, and information concerning the call of the plurality of pseudo-functional entities can be logged. The call can include at least one of reading access and writing access to data of the plurality of pseudo-structural entities. At least one other pseudo-functional entity that is being triggered by execution of at least one pseudo-functional entity of the plurality of pseudo-functional entities can be determined. A sequence of execution of the plurality of pseudo-functional entities and at least one triggering condition for each pseudo-functional entity of the plurality of pseudo-functional entities can be determined based on the execution of the plurality of pseudo-functional entities. A corresponding execution of the plurality of functional entities, the sequence of execution of the plurality of functional entities, and triggering conditions of the plurality of functional entities during execution of the runtime model can be determined based on the execution of the plurality of pseudo-functional entities, the sequence of execution of the plurality of pseudo-functional entities, and the at least one triggering condition. The runtime model of the business object can be modified based on the simulation runtime model of the business object.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

There is a need for a business object service simulation approach that is precise enough to whether a certain functional entity can be executed during the execution of a certain business object service and which entities are maximally executed. Additionally, there is a need for a business object service simulation having simulation runtime that is capable of behaving like the business object processing runtime.

To address these and potentially other deficiencies of currently available solutions, one or more implementations of the current subject matter provide methods, systems, articles or manufacture, and the like that can, among other possible advantages, provide systems and methods for providing systems, methods, and computer program products for performing business object service simulation.

In some implementations, the current subject matter can provide systems and methods that enable prediction of behavior of various business objects within computing systems during business object runtime. This result can, in at least some implementations, be accomplished by simulating runtime behavior of desired business objects to test dependencies on other business objects or entities within and/or outside the computing system as well as the operational capabilities of the desired business objects. The simulation can also provide an ability to understand how the service(s) provided by the selected business objects would perform during runtime and to correct any errors during simulation runtime mode before services are put into business object runtime mode.

Figure 1:
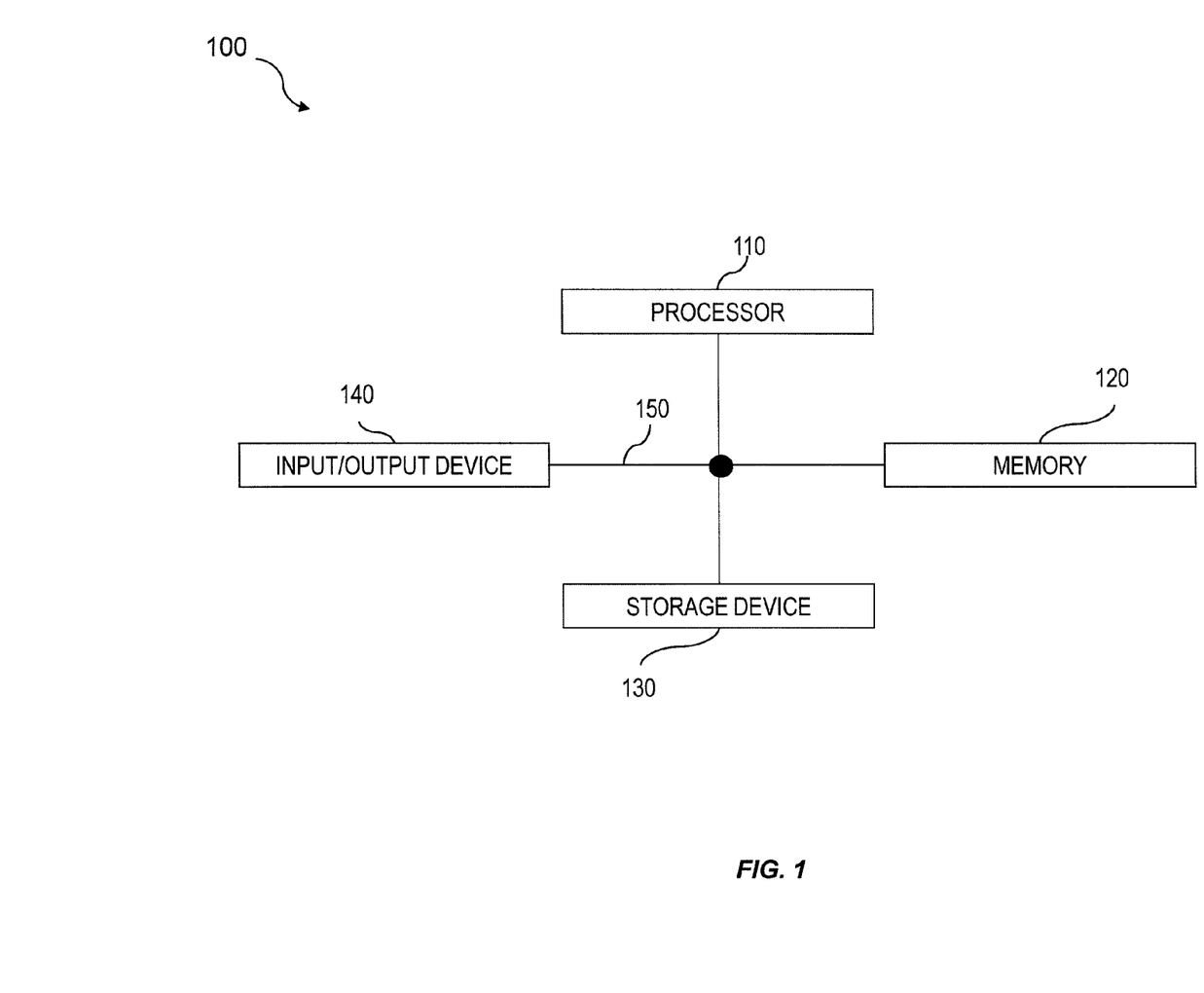
FIG. 1 illustrates an exemplary system for performing a business object service simulation, according to some implementations of the current subject matter.

In some implementations, the current subject matter can be configured to be implemented in a system 100, as shown in FIG. 1. The system 100 can include a processor 110, a memory 120, a storage device 130, and an input/output device 140. Each of the components 110, 120, 130 and 140 can be interconnected using a system bus 150. The processor 110 can be configured to process instructions for execution within the system 100. In some implementations, the processor 110 can be a single-threaded processor. In alternate implementations, the processor 110 can be a multi-threaded processor. The processor 110 can be further configured to process instructions stored in the memory 120 or on the storage device 130, including receiving or sending information through the input/output device 140. The memory 120 can store information within the system 100. In some implementations, the memory 120 can be a computer-readable medium. In alternate implementations, the memory 120 can be a volatile memory unit. In yet some implementations, the memory 120 can be a non-volatile memory unit. The storage device 130 can be capable of providing mass storage for the system 100. In some implementations, the storage device 130 can be a computer-readable medium. In alternate implementations, the storage device 130 can be a floppy disk device, a hard disk device, an optical disk device, a tape device, non-volatile solid state memory, or any other type of storage device. The input/output device 140 can be configured to provide input/output operations for the system 100. In some implementations, the input/output device 140 can include a keyboard and/or pointing device. In alternate implementations, the input/output device 140 can include a display unit for displaying graphical user interfaces.

Figure 2:
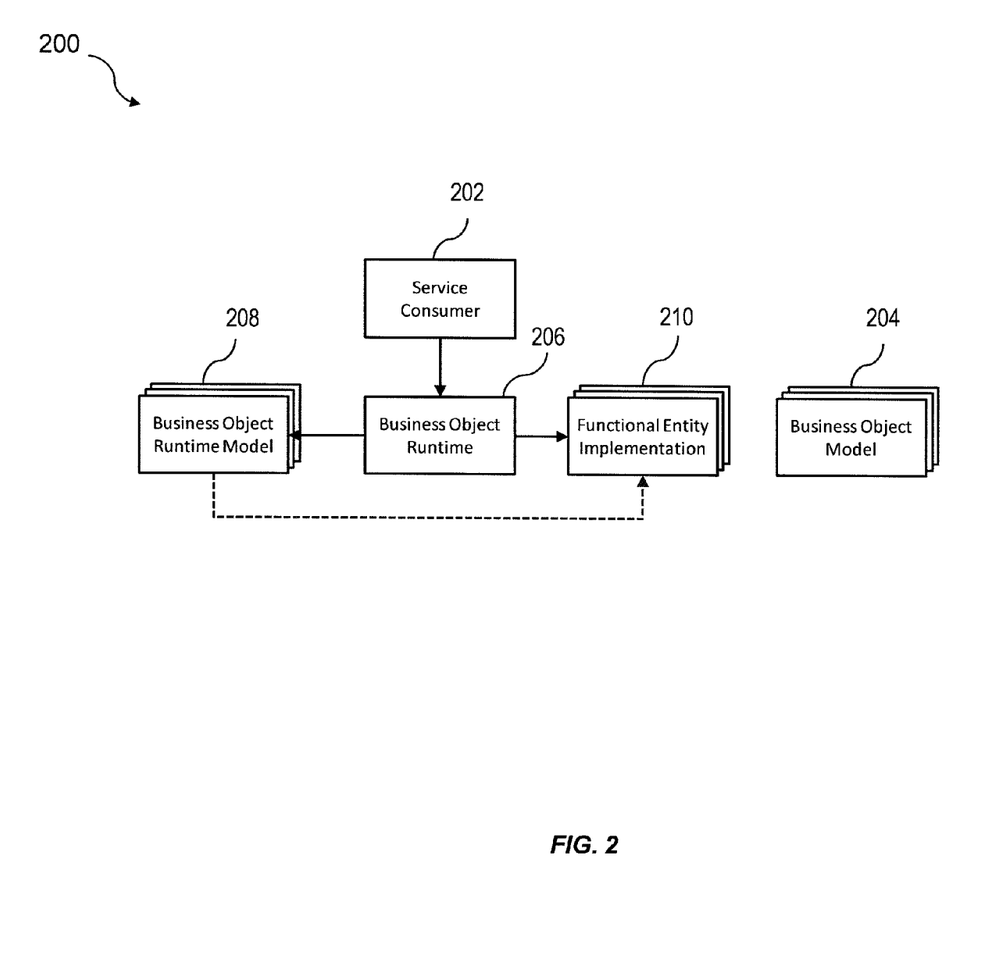
FIG. 2 illustrates an exemplary business object runtime system, according to some implementations of the current subject matter.
Figure 4:
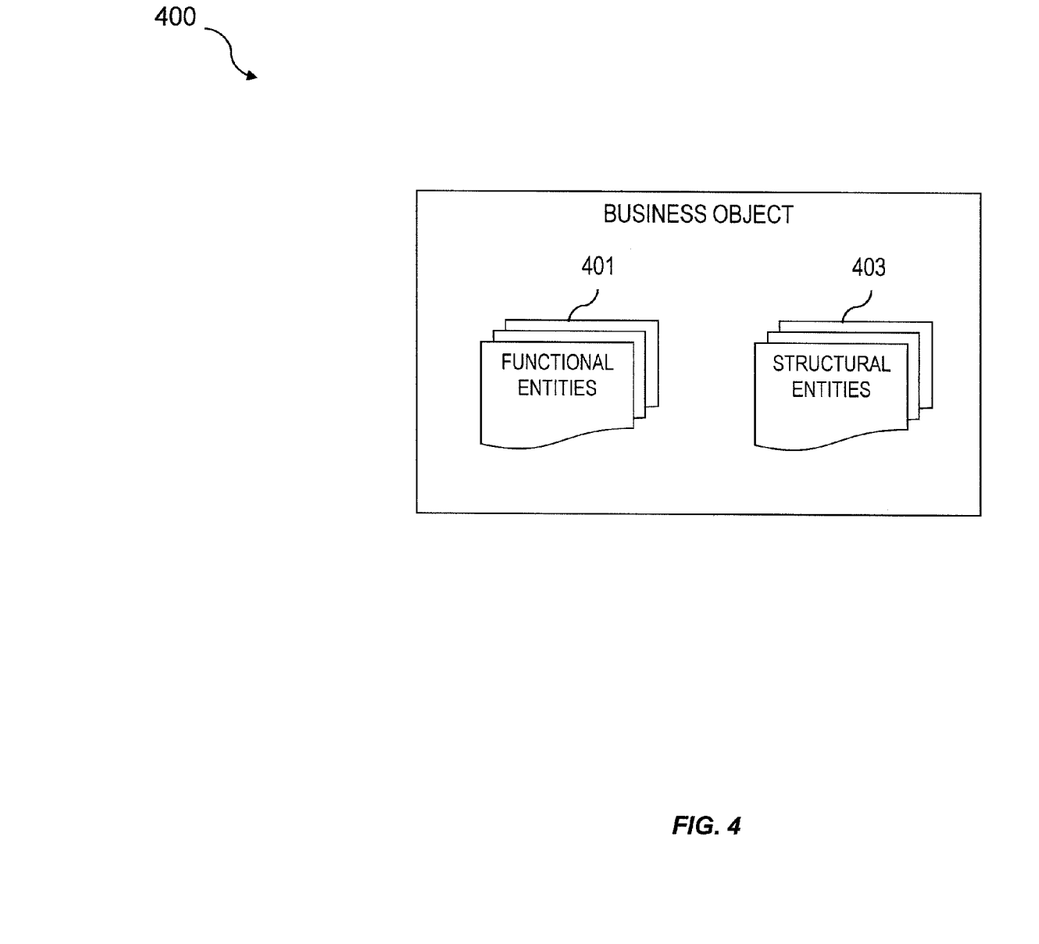
FIG. 4 illustrates an exemplary business object.

FIG. 2 illustrates an exemplary business object runtime system 200, according to some implementations of the current subject matter. The system 200 can be configured to include a service consumer 202, such as for example an end-user of the system 200, that can call on the business object service. Each business object can be configured to be characterized by a business object model 204 and can be further configured to provide various services to service consumer 202. The business object model 204 can be configured to be further defined by at least one functional entity 401 and at least one structural entity 403, as shown in FIG. 4. At runtime, the business object model 204 can be converted into business object runtime model 208. In some implementations, during runtime of the business object models, functional entities that are relevant to a particular business object service being invoked can be selected for execution, initiated, and appropriately executed. During execution, the functional entities can be configured to perform a plurality of functions, including "calls" for data contained within at least one structural entity. Such calls can include requests for read and/or write access to the data contained within the at least one structural entity. As can be understood by one having ordinary skill in the relevant art, other functions can depend on a particular business object service being invoked that corresponds to business object runtime model 208 and are not limited to the requests for read/write access of data.

As shown in FIG. 2, upon invocation of a particular business object service 206 at runtime, the business object runtime model 208 can be configured to call on relevant functional entities 210. Each called-on functional entity 210 can be further configured to call on other functional entities 210. Execution of functional entities can be further dependent on meeting of triggering condition(s) corresponding to the respective functional entities. For example, a request from a consumer for particular business data stored in a predetermined location for delivery in a specified format can instantiate functional entities responsible for retrieval of such data, sorting of the obtained data, formatting of the sorted data, and delivery of formatted data to the consumer. Each functional entity can have a triggering condition that can include receiving information and/or data from a functional entity that was handling the requested data before. Other examples of functional entities and triggering conditions are possible and the current subject matter is not limited to the above examples.

In some implementations, the functional entities can be implicitly triggered. For example, the business object runtime model can be set up in way that at each step of executing functional entities required for handling of service request from the service consumer, a separate functional entity can store results of execution of each functional entity involved in the service request. At runtime, such implicit triggering of functional entities can result in a time delay during execution of the service request. Thus, knowledge of which functional entities are executed, their triggers, and time taken by their execution can be important.

Proper execution of a business object model during runtime can depend on a careful design of business objects and their corresponding runtime models by developers at "design time." In some implementations, at design time, a business object's functional and structural entities can be appropriately developed, and its execution sequence or sequences, triggering condition or conditions, execution time or times, and/or one or more other parameters can be appropriately determined to ensure that appropriate functional entities are called at a proper time and upon receipt of correct triggering conditions.

Figure 3:
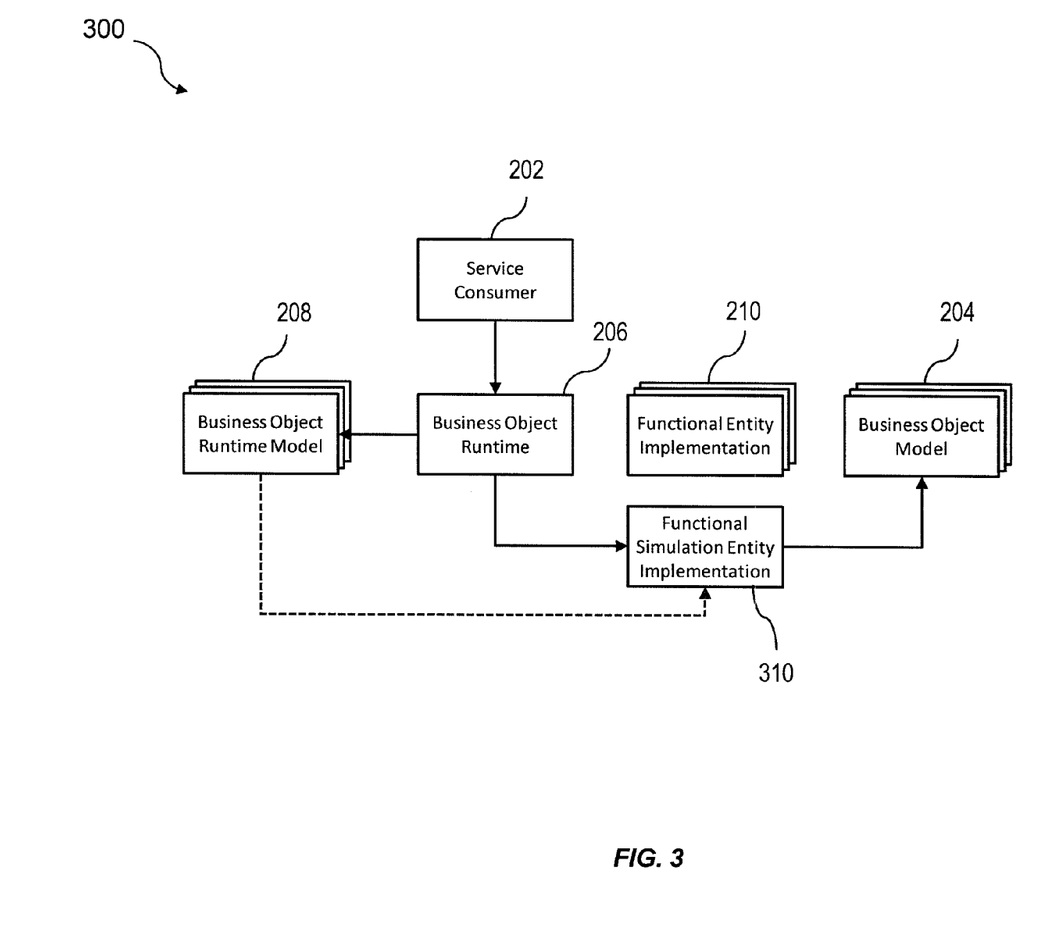
FIG. 3 illustrates an exemplary business object simulation runtime system, according to some implementations of the current subject matter.

FIG. 3 illustrates an exemplary business object simulation runtime system 300, according to some implementations of the current subject matter. The system 300 can be configured to be similar to the system 200 and can include the following components of the system 200: business object runtime model 208, business object runtime 206, function entities 210, and business object model 204. In addition to these components, the system can be further configured to include functional simulation entities 310. To conduct a simulation of the functional entities 210 and to determine how functional entities 210 would behave during runtime, the appropriate functional simulation entities 310 can be selected, instantiated and executed instead of the functional entities 210. This can be accomplished by replacing the references to the entities 210 in the business object runtime model with references to the functional simulation entities 310. Such replacement can be accomplished through replacement of appropriate code portions in the business object runtime model. This procedure can be done manually by a developer or a user by selecting a simulation runtime model or automatically.

In some implementations, the functional simulation entities 310 can be limited to specific functional entities, e.g., read and/or write access requests, to determine what data is being accessed by the functional entities during runtime. During simulation, the real runtime functional entities 210 can be configured to not be selected, instantiated or executed and instead can be bypassed, as indicated in FIG. 3.

As shown in FIG. 3, during simulation runtime, the service consumer 202, which in this case can be a developer performing a simulation of the designed business object, can select a particular service or a plurality of services of the business object and indicate all parameters associated with selection of such service(s). For example, a service can include a request for a particular business object data to be delivered in a particular format, and parameters can include delivery of the data in an appropriate format (e.g., specific data sorted in a predetermined way and formatted appropriately). Upon selection of the business object service, the business object runtime 206 can be configured to execute the business object service according to the business object runtime model 208. However, during simulation, instead of accessing functional entities 210 as implemented for runtime purposes, the business object runtime model 208 can be configured to call upon appropriate functional simulation or pseudo-functional entities 310 that correspond to the service request made by the consumer. By accessing functional simulation entities, the real execution of the functional entities can be avoided. Selection, instantiation, and execution of the functional simulation entities can be logged or otherwise recorded by the system 300. For example, triggering conditions for executing each functional simulation entity, one or more execution sequence of functional simulation entities, references to and/or by each functional simulation entity, encountered execution errors, time taken by each entity, and/or any other parameters can be appropriately recorded. In some implementations, the recorded parameters can be further stored in a memory (whether temporary or permanent) for the purposes of using it to modify behavior of the real or runtime functional entities. The runtime functional entities 210 can be configured to never be executed during simulation of the business object runtime model (otherwise referred to as "business object simulation runtime model" or "simulation runtime model"). Upon execution of the pseudo-functional entities 310, the pseudo-functional entities 310 can also be appropriately executed on and/or their results can be applied to the pseudo-structural entities of the business object.

Execution of the pseudo-functional entities 310 can be evaluated and results can be applied to the business object runtime model 208 for use during runtime execution of the business object runtime model. The evaluation of the logging of the results of execution of the functional entities can determine which functional entities are executed and when. Such evaluation can also reveal what other functional entities are triggered and when as well as triggering conditions which can be requisite for execution of various functional entities can be determined. These determinations can be automatically provided to the developer(s) and/or any other users of the system. Additionally, the determinations can further be used to change, modify and/or replace implementation of the functional entities during real runtime of the business object. Such changes, modifications and/or replacements can be applied manually by the developer(s)/user(s) or automatically.

It should be further noted that because all possible functional entities can be executed during simulation runtime model, all functional entities that would be executed along with their triggering conditions can be determined according to at least some implementations. This information can be important in determining how the business object runtime model would operate when a real service request is received from a service consumer. It can also prevent generation of misleading results concerning operation of the business object runtime model. By running the simulation runtime, the business object model can be appropriately enhanced by storage of functional entities' triggering information and any additional information. Further, the business object model can be enriched with information describing behavior of each functional entity regarding potential read and write accesses to data of structural entities. In some implementations, a writing access can be classified as create, update, and/or delete operations. This information can be used to evaluate behavior of the functional entities during the simulation as well as which other functional entities are to be triggered afterwards.

Use of the business object simulation runtime can avoid the need for implementation and maintenance of a separate simulation runtime besides the business object runtime. A simulation application can be configured to reuse the business object runtime. During simulation, the business object runtime model can be modified by the simulation application by replacing the references to the original functional entity's implementations with references to functional entity's implementation in the simulation. This generic functional simulation entity can evaluate the reading and writing behavior of the originally called functional entity from the business object runtime model and can execute the reading and writing access on pseudo-structural entities. The data of pseudo-structural entities can be randomly created. The changes caused on the pseudo-structural entities' data can be sufficient to trigger other functional entities. Finally, a transitive closure of all explicitly and implicitly triggered functional entities can be executed.

In some implementations, storage of triggering conditions of functional entities in the business object model can be used to realize a more precise business object service simulation based only on model information. Because the simulation can be based on model data, the business object model can be verified before implementation of functional entities is completed. This can be used for rapid prototyping or to independently verify business object models in early stages of development. Also, worst case scenario analysis of business object runtime model execution can be determined. Further, reusing of the business object framework for the purposes of simulation can be used to build simulation applications with low maintenance and development efforts.

Figure 5:
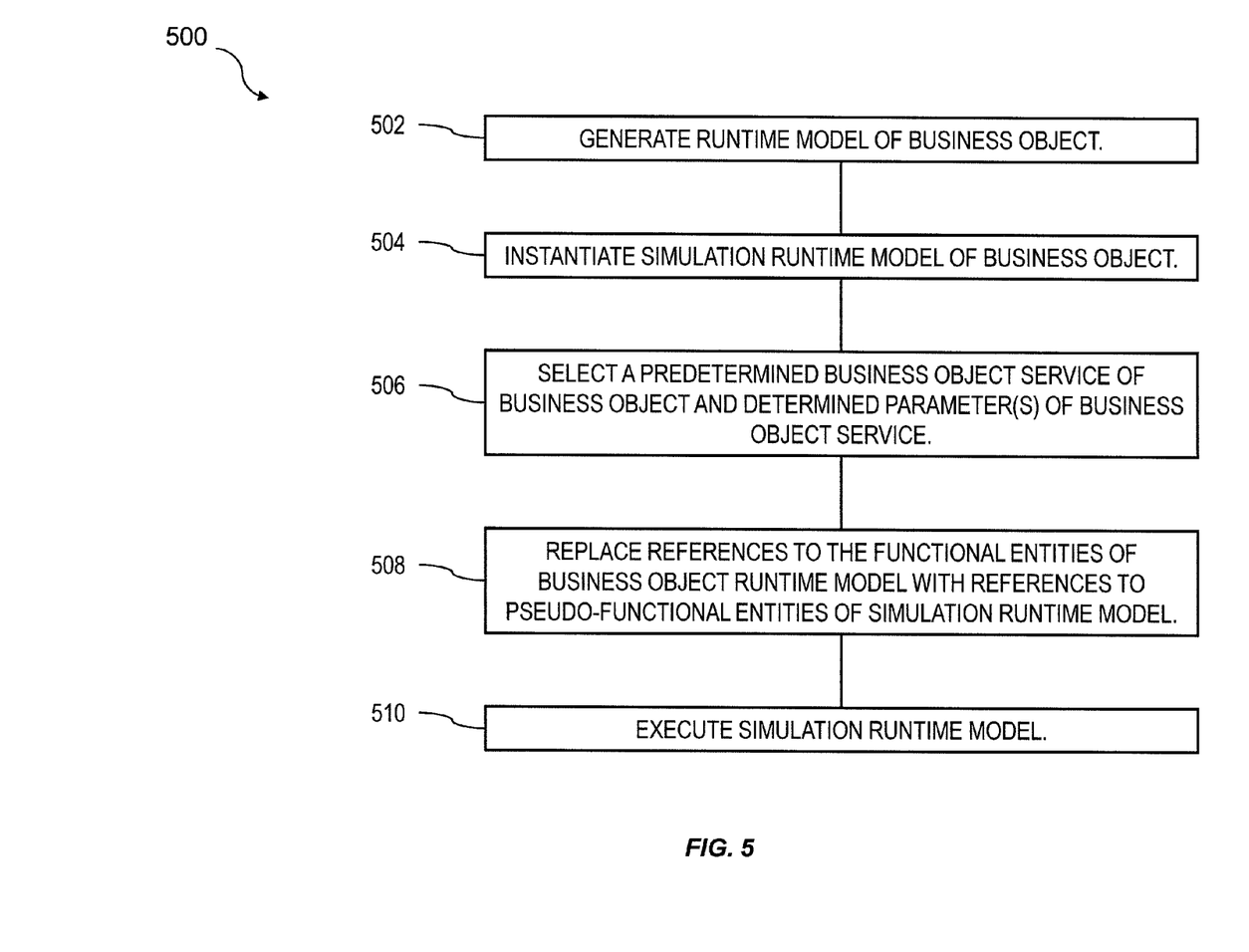
FIG. 5 shows a flow chart illustrating features of a method for executing a business object simulation runtime.

FIG. 5 illustrates an example of a method 500 consistent with some implementations of the current subject matter for performing business object service simulation. At 502, a runtime model of a business object can be generated. In some implementations, the runtime model of a business object can include one or more structural and functional entities, as indicated above. At 504, a simulation runtime model of the business object can be instantiated. The simulation runtime model can include one or more pseudo-structural and pseudo-functional entities. As stated above and discussed in greater detail below, for the purposes of running a simulation, in the business object runtime mode, references to the actual functional entities can be replaced with references to the pseudo-functional entities. At 506, during the simulation runtime model, a predetermined business object service of the business object can be selected and at least one parameter of the predetermined business object service can be determined. Such parameters can be determined by the user running the simulation of the business object runtime. At 508, references to the functional entities of the business object runtime model can be replaced with references to the pseudo-functional entities of the simulation runtime model. Once the replacement is made, the simulation runtime model can be executed using the pseudo-functional entities at 510.

In some implementations, during execution of the simulation runtime model, a response from the pseudo-functional entities can be appropriately determined. Based on the recorded response from the pseudo-functional entities, changes to the pseudo-structural entities can be appropriately executed.

When executing a simulation runtime model, calls to the pseudo-functional entities can be made and such calls can be logged. The calls can include at least one of reading access and writing access to data of the pseudo-structural entities. The calls and their results can be logged in a memory that can be coupled to the system running the simulation runtime model.

The current subject matter can be further configured to determine triggering conditions for the pseudo-function entities by determining at least one other pseudo-functional entity that is being triggered by execution of at least one pseudo-functional entity. Based on the execution of the pseudo-functional entities, a sequence of execution of the pseudo-functional entities can be determined. Using the execution of the pseudo-functional entities, the sequence of execution of the pseudo-functional entities, as well as of the triggering conditions, corresponding execution of the functional entities, the sequence of execution of the functional entities, and triggering conditions of the functional entities during runtime model, can be appropriately determined. This approach can facilitate modification of the runtime model of the business object based on the simulation runtime model of the business object.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A method comprising:
    generating, by at least one processor, a runtime model of a business object comprising a hierarchy of business object nodes, the runtime model comprising a plurality of structural entities and a plurality of functional entities, the structural entities each encapsulating data values and the functional entities each performing at least one function;
    instantiating, by the at least one processor, a simulation runtime model of the business object, the simulation runtime model comprising a plurality of pseudo-structural entities and a plurality of pseudo-functional entities, the pseudo-structural entities each encapsulating data values and the pseudo-functional entities each performing at least one function;
    selecting, by the at least one processor during the simulation runtime model, a predetermined business object service of the business object and determining at least one parameter of the predetermined business object service;
    replacing, by the at least one processor during the simulation runtime model, references in code to the plurality of functional entities of the runtime model with references in code to the plurality of pseudo-functional entities of the simulation runtime model; and
    executing, by the at least one processor during the simulation runtime model, the simulation runtime model using the plurality of pseudo-functional entities.

2. A method as in claim 1, further comprising:
    determining, during execution of the simulation runtime model by the at least one data processor, a response of the plurality of pseudo-functional entities;
    executing, based on the response of the plurality of pseudo-functional entities and by the at least one data processor, changes to at least one of the plurality of pseudo-structural entities; generating a call of the plurality of pseudo-functional entities; and
    logging, by the at least one data processor, information concerning the call of the plurality of pseudo-functional entities, the call including at least one of reading access and writing access to data of the plurality of pseudo-structural entities.

3. A non-transitory computer program product storing instructions that, when executed by at least one processor, cause the at least one processor to perform operations comprising:
    generating a runtime model of a business object comprising a hierarchy of business object nodes, the runtime model comprising a plurality of structural entities and a plurality of functional entities, the structural entities each encapsulating data values and the functional entities each performing at least one function;
    instantiating a simulation runtime model of the business object, the simulation runtime model comprising a plurality of pseudo-structural entities and a plurality of pseudo-functional entities, the pseudo-structural entities each encapsulating data values and the pseudo-functional entities each performing at least one function;
    selecting, during the simulation runtime model, a predetermined business object service of the business object and determining at least one parameter of the predetermined business object service;
    replacing, during the simulation runtime model, references in code to the plurality of functional entities of the runtime model with references to the plurality of pseudo-functional entities of the simulation runtime model; and
    executing during the simulation runtime model, the simulation runtime model using the plurality of pseudo-functional entities.

4. A computer program product as in claim 3, wherein the operations further comprise determining, during execution of the simulation runtime model, a response of the plurality of pseudo-functional entities.

5. A computer program product as in claim 4, wherein the operations further comprise executing, based on the response of the plurality of pseudo-functional entities, changes to at least one of the plurality of pseudo-structural entities.

6. A computer program product as in claim 5, wherein the operations further comprise: generating a call of the plurality of pseudo-functional entities; and logging information concerning the call of the plurality of pseudo-functional entities.

7. A computer program product as in claim 6, wherein the call includes at least one of reading access and writing access to data of the plurality of pseudo-structural entities.

8. A computer program product as in claim 3, wherein the operations further comprise determining at least one other pseudo-functional entity that is being triggered by execution of at least one pseudo-functional entity of the plurality of pseudo-functional entities.

9. A computer program product as in claim 8, wherein the operations further comprise determining, based on the execution of the plurality of pseudo-functional entities, a sequence of execution of the plurality of pseudo-functional entities and at least one triggering condition for each pseudo-functional entity of the plurality of pseudo-functional entities.

10. A computer program product as in claim 9, wherein the operations further comprise determining, based on the execution of the plurality of pseudo-functional entities, the sequence of execution of the plurality of pseudo-functional entities, and the at least one triggering condition, a corresponding execution of the plurality of functional entities, the sequence of execution of the plurality of functional entities, and triggering conditions of the plurality of functional entities during execution of the runtime model.

11. A computer program product as in claim 10, wherein the operations further comprise modifying the runtime model of the business object based on the simulation runtime model of the business object.

12. A system comprising:
   at least one processor; and
   at least one machine-readable medium storing instructions that, when executed by the at least one processor, cause the at least one processor to perform operations comprising:
   generating a runtime model of a business object comprising a hierarchy of business object nodes, the runtime model comprising a plurality of structural entities and a plurality of functional entities, the structural entities each encapsulating data values and the functional entities each performing at least one function;
   instantiating a simulation runtime model of the business object, the simulation runtime model comprising a plurality of pseudo-structural entities and a plurality of pseudo-functional entities, the pseudo-structural entities each encapsulating data values and the pseudo-functional entities each performing at least one function;
   selecting, during the simulation runtime model, a predetermined business object service of the business object and determining at least one parameter of the predetermined business object service;
   replacing, during the simulation runtime model, references in code to the plurality of functional entities of the runtime model with references to the plurality of pseudo-functional entities of the simulation runtime model; and
   executing, during the simulation runtime model, the simulation runtime model using the plurality of pseudo-functional entities.

13. A system as in claim 12, wherein the operations further comprise determining, during execution of the simulation runtime model, a response of the plurality of pseudo-functional entities.

14. A system as in claim 11, wherein the operations further comprise executing, based on the response of the plurality of pseudo-functional entities, changes to at least one of the plurality of pseudo-structural entities.

15. A system as in claim 14, wherein the operations further comprise: generating a call of the plurality of pseudo-functional entities; and logging information concerning the call of the plurality of pseudo-functional entities.

16. A system as in claim 15, wherein the call includes at least one of reading access and writing access to data of the plurality of pseudo-structural entities.

17. A system as in claim 12, wherein the operations further comprise determining at least one other pseudo-functional entity that is being triggered by execution of at least one pseudo-functional entity of the plurality of pseudo-functional entities.

18. A system as in claim 17, wherein the operations further comprise determining, based on the execution of the plurality of pseudo-functional entities, a sequence of execution of the plurality of pseudo-functional entities and at least one triggering condition for each pseudo-functional entity of the plurality of pseudo-functional entities.

19. A system as in claim 18, wherein the operations further comprise determining, based on the execution of the plurality of pseudo-functional entities, the sequence of execution of the plurality of pseudo-functional entities, and the at least one triggering condition, a corresponding execution of the plurality of functional entities, the sequence of execution of the plurality of functional entities, and triggering conditions of the plurality of functional entities during execution of the runtime model.

20. A system as in claim 19, wherein the operations further comprise modifying the runtime model of the business object based on the simulation runtime model of the business object.

* * * * *